US012683494B1

(12) United States Patent
Viswanathan et al.

(10) Patent No.: US 12,683,494 B1
(45) Date of Patent: Jul. 14, 2026

(54) MULTI-PORT POWER CONVERTERS AND ASSOCIATED METHODS

(71) Applicant: Maxim Integrated Products, Inc., San Jose, CA (US)

(72) Inventors: Ananthakrishnan Viswanathan, San Jose, CA (US); Robert A. McCarthy, Algonquin, IL (US); Simo Radovic, Rocklin, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 174 days.

(21) Appl. No.: 18/473,264

(22) Filed: Sep. 24, 2023

Related U.S. Application Data

(60) Provisional application No. 63/377,009, filed on Sep. 24, 2022.

(51) Int. Cl.
H02M 3/158 (2006.01)
H02M 1/00 (2007.01)
*H02J 50/10* (2016.01)

(52) U.S. Cl.
CPC ........... H02M 3/158 (2013.01); H02M 1/009 (2021.05); *H02J 50/10* (2016.02)

(58) Field of Classification Search
CPC .............................. H02M 1/009; H02M 3/158
See application file for complete search history.

(56) References Cited

U.S. PATENT DOCUMENTS

| | | | | |
|---|---|---|---|---|
| 9,479,051 | B2 * | 10/2016 | Tseng | H02M 3/158 |
| 2018/0022221 | A1 * | 1/2018 | Kusch | B60L 53/14 |
| | | | | 320/109 |
| 2018/0123516 | A1 * | 5/2018 | Kim | H03F 1/02 |
| 2022/0052604 | A1 * | 2/2022 | Adest | G05F 5/00 |
| 2025/0079865 | A1 * | 3/2025 | Viswanathan | H02J 7/865 |
| 2025/0088024 | A1 * | 3/2025 | Viswanathan | H02J 7/34 |

* cited by examiner

*Primary Examiner* — Sisay G Tiku
(74) *Attorney, Agent, or Firm* — ArentFox Schiff LLP

(57) ABSTRACT

A method for operating a multi-port power converter includes (a) controlling flow of electric current through an inductor of the multi-port power converter using a control switching device of the multi-port power converter and (b) causing one of a plurality of load switch assemblies of the multi-port power converter to provide a freewheel path for electric current flowing through the inductor in response to the control switching device switching from its on-state to its off-state. Each load switch assembly is electrically coupled between the inductor and a respective one of a plurality of ports of the multi-port power converter.

20 Claims, 14 Drawing Sheets

100

500

Magnitude

512 — $\Phi_c$

0

Time

Magnitude

514

0

$\Phi_s(1)$

Time

Magnitude

516

0

$\Phi_s(2)$

Time

Magnitude

518

0

$i_L$

Time

Magnitude

520

0

$i_p(1)$

Time

Magnitude

522

0

$i_p(2)$

Time $t_1$    $t_2$    $t_3$

MULTI-PORT POWER CONVERTERS AND ASSOCIATED METHODS

RELATED APPLICATIONS

This application claims benefit of priority to U.S. Provisional Patent Application Ser. No. 63/377,009, filed on Sep. 24, 2022, which is incorporated herein by reference.

BACKGROUND

A multi-port power converter is a power converter with multiple ports, such as for powering multiple loads. Some multi-port power converters are configured to selectively provide electric power to one or more ports, e.g., for controlling which load is powered at a given time.

BRIEF DESCRIPTION OF THE DRAWINGS

Figures 5A, 5B, 5C, 5D, 5E, 5F:
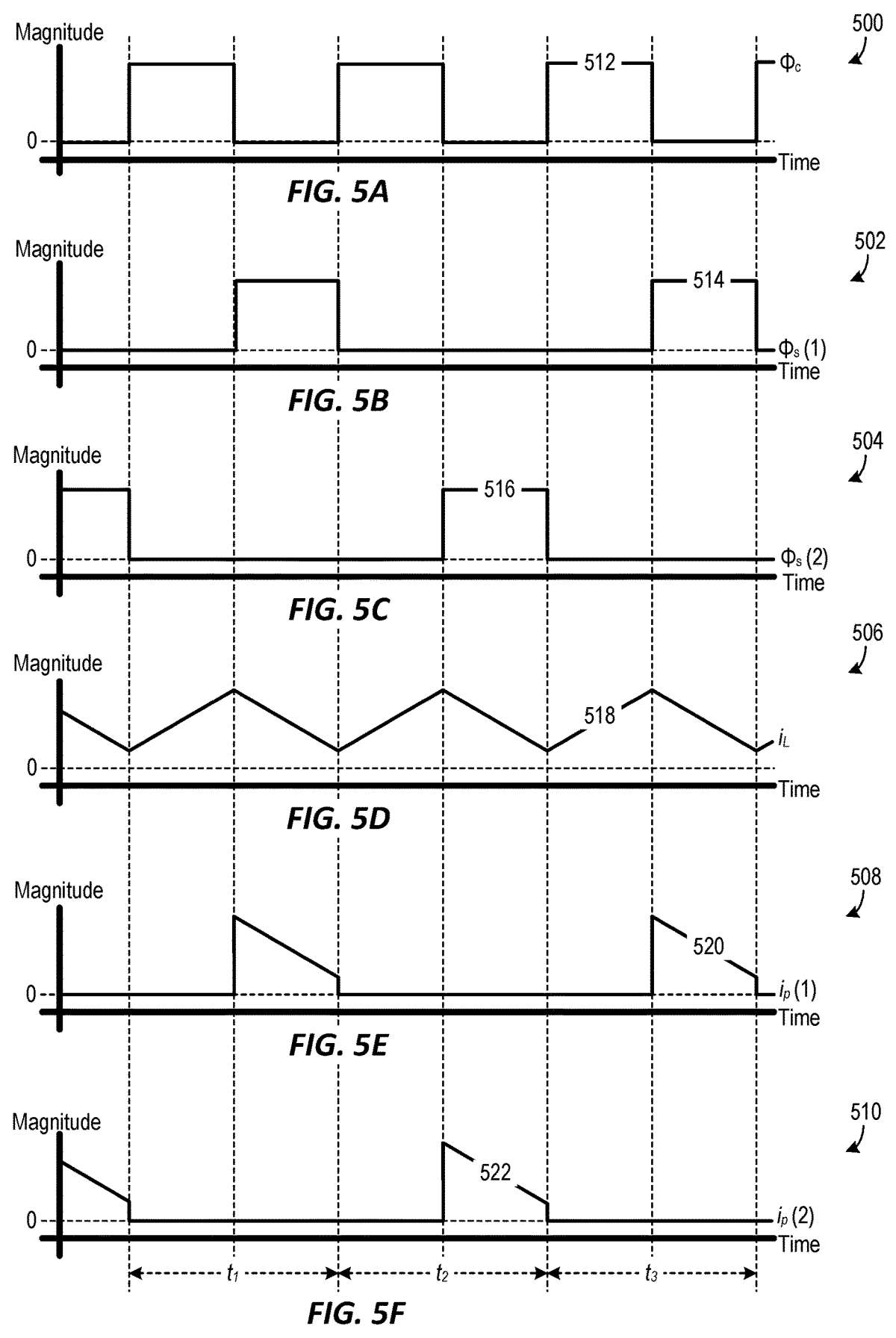

FIGS. 5A, 5B, 5C, 5D, 5E, and 5F are graphs collectively illustrating one example of operation of the FIG. 2 multi-port power converter where the first load switch assembly and the second load switch assembly alternately operate in their respective freewheel states.

Figures 11A, 11B, 11C, 11D, 11E, 11F, 11G, 11H:
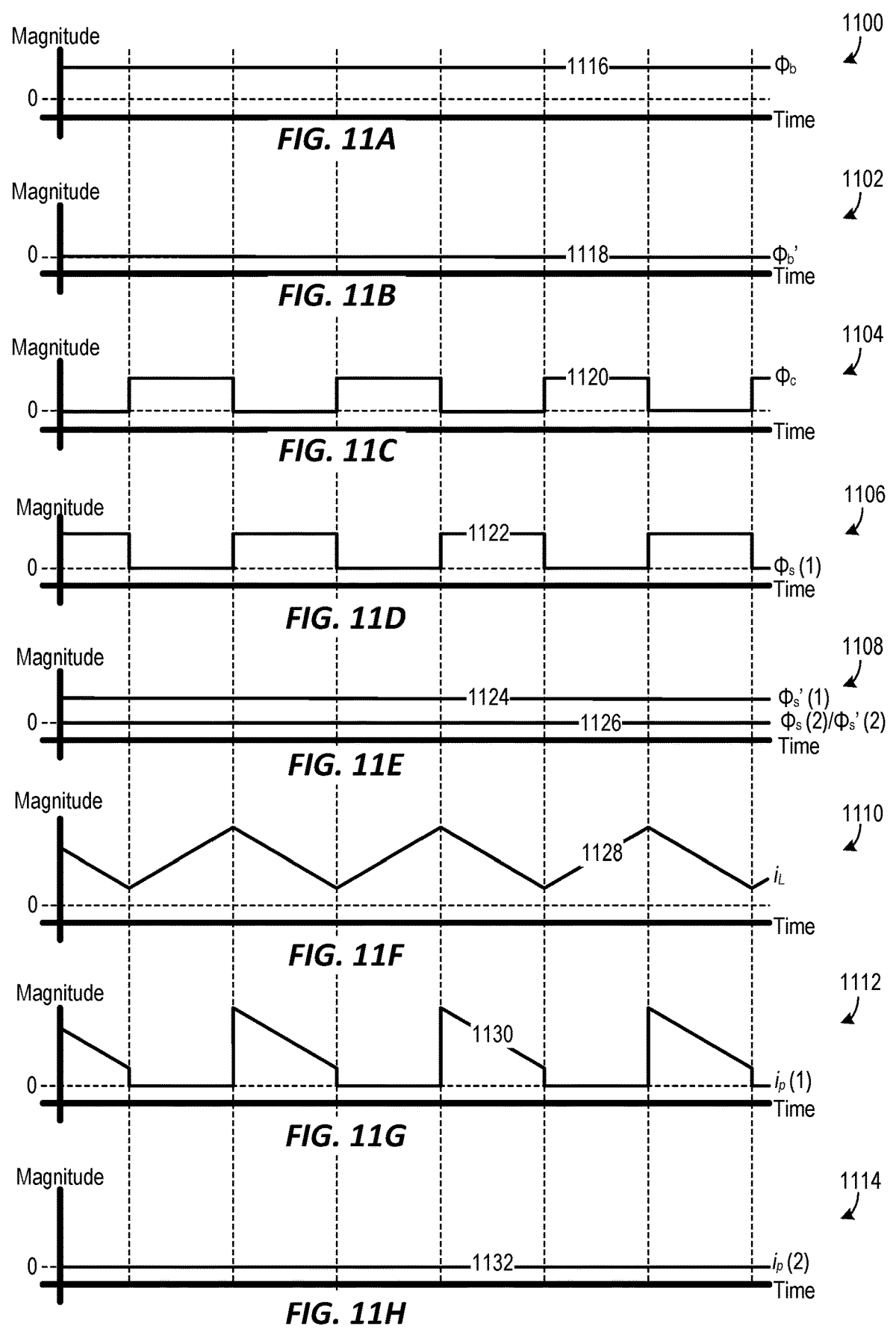

FIGS. 11A, 11B, 11C, 11D, 11E, 11F, 11G, and 11H are graphs collectively illustrating one example of operation of the FIG. 10 multi-port power converter operating as a boost converter.

DETAILED DESCRIPTION OF THE EMBODIMENTS

Disclosed herein are new multi-port power converters and associated methods which significantly advance the state of the art. Certain embodiments of the new multi-port power converters include load switch assemblies that perform multiple functions. For example, in some embodiments, the load switch assemblies not only enable selective provisioning of electric power to ports of the multi-port power converters, but the load switch assemblies also provide freewheel paths for electric current flowing through respective inductors of the multi-port power converters, thereby potentially enabling a dedicated freewheel switching device to be omitted from the multi-port power converters. Accordingly, particular embodiments of the new multi-port power converters may achieve a higher efficiency, smaller size, wider practical operating range, and/or lower cost, than conventional multi-port power converters.

Figure 1:
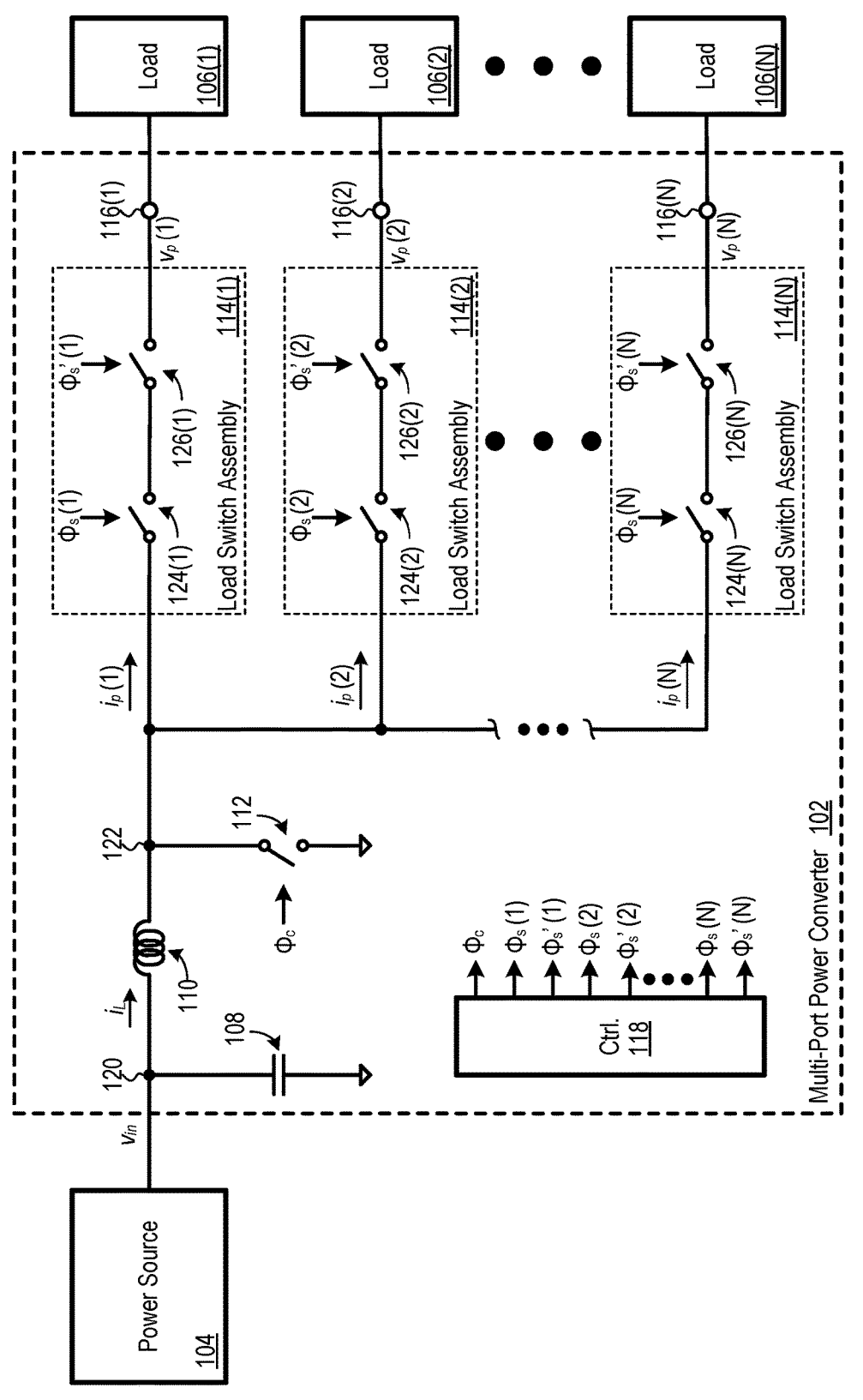
FIG. 1 is a schematic diagram of an electrical system including a multi-port power converter, according to an embodiment.

FIG. 1 is a schematic diagram of an electrical system 100 including a multi-port power converter 102, where multi-port power converter 102 is one embodiment of the new multi-port power converters disclosed herein. Electrical system 100 further includes an electric power source 104 and N loads 106, where N is an integer greater than one. In this document, specific instances of an item may be referred to by use of a numeral in parentheses (e.g. load 106(1)) while numerals without parentheses refer to any such item (e.g. loads 106). Electric power source 104 is configured to provide electric power to electrical system 100. In some embodiments, electric power source 104 includes another power converter (e.g., a battery charger, an alternating current (AC) adaptor, and/or a direct current (DC) adaptor) and/or a battery.

Multi-port power converter 102 includes an input capacitor 108, an inductor 110, a control switching device 112, N load switch assemblies 114, N ports 116, and a controller 118. Electric power source 104 is configured to provide electric power to multi-port power converter 102 at an input node 120, and input capacitor 108 is electrically coupled between input node 120 and ground. In this document, "ground" is not limited to being earth ground but instead could be any reference node. Input capacitor 108 is configured, for example, to provide a path for input ripple current to multi-port power converter 102. Inductor 110 is electrically coupled between input node 120 and a first switching node 122. Control switching device 112 is electrically coupled between first switching node 122 and ground, and control switching device 112 is thereby electrically coupled to inductor 110. Control switching device 112 is controlled by a control signal De generated by controller 118, as discussed below. In this document, a switching device includes, for example, one or more transistors, including but not limited to, a field effect transistor (FET), a bipolar junction transistor (BJT), or an insulated gate bipolar junction transistor (IGBT). However, a switching device is not limited to including a transistor, and a switching device could instead include a relay, a contactor, or a similar device.

Each load switch assembly 114 is electrically coupled between first switching node 122 and a respective port 116. As such, load switch assemblies 114 are electrically coupled in parallel between inductor 110 and respective ports 116.

Each load switch assembly 114 includes a switching device 124 and a switching device 126 electrically coupled in series between inductor 110 and a respective port 116. Each switching device 124 is controlled by a respective control signal $\phi_s$ generated by controller 118, and each switching device 126 is controlled by a respective control signal $\phi_s'$ generated by controller 118. In some embodiments, such as in embodiments where switching devices 124 are capable of blocking bidirectional electric current flow, switching devices 126 are omitted from load switch assemblies 114.

Each load 106 is electrically coupled to a respective port 116. Examples of ports 116 include, but are not limited to, terminals, connectors, wires, printed circuit board (PCB) traces, bus bars, or the like, which electrically couple load switch assemblies 114 to loads 106. Although each load 106 is depicted as being a single element, each load 106 could include multiple constituent elements, such as discussed below with respect to FIG. 6. In some embodiments, each load 106 includes a wireless power transfer interface or a wired power transfer interface. In this document, a "wired power transfer interface" includes any type of interface that transmits electric power using one or more electrical conductors, such as using one or more cables, one or more PCB traces, one or more bus bars, etc. Each load 106 need not have the same configuration. For example, in certain embodiments, load 106(1) includes a wireless power transfer interface and load 106(2) includes a wired power transfer interface.

Controller 118 is configured to generate control signals $\phi_c$, $\phi_s$, and $\phi_s'$ for controlling operation of multi-port power converter 102. Controller 118 is formed, for example, of analog electronic circuitry and/or digital electronic circuitry. Certain embodiments of controller 118 include a processor (not shown) and a memory (not shown), where the processor is configured to execute instructions (e.g., software and/or firmware) stored in the memory, to perform one or more functions of controller 118. While controller 118 is depicted as being a single element, controller 118 could be formed of multiple constituent elements that need not be collocated. For example, some embodiments of controller 118 are at least partially implemented by a distributed computing system, such as a cloud computing system. Additionally, although controller 118 is depicted as being separate from other elements of multi-port power converter 102, controller 118 could be at least partially combined with one or more other elements of multi-port power converter 102. Connections between controller 118 and switching devices are not shown for illustrative clarity.

Controller 118 is configured to generate control signal $\phi_c$ to control flow of electric current $i_L$ through inductor 110 using control switching device 112, such as to regulate one or more parameters of multi-port power converter 102. For example, controller 118 may be configured to generate control signal $\phi_c$ to control duty cycle of control switching device 112 using a pulse width modulation (PWM) technique or a pulse frequency modulation (PFM) technique, to regulate one or more parameters of multi-port power converter 102. Examples of regulated parameters include, but are not limited to, respective voltages $v_p$ at ports 116 and/or respective electric currents $i_p$ flowing through load switch assemblies 114 to ports 116. Multi-port power converter 102 has a boost topology, and each voltage $v_p$ is therefore greater than or equal to a voltage $v_{in}$ at input node 120, neglecting losses in multi-port power converter 102.

Additionally, controller 118 is configured to generate control signals $\phi_s$ and $\phi_s'$ such that each load switch assembly 114 may operate in at least two possible states, i.e., in a freewheel state or in a blocking state. The freewheel state of a load switch assembly 114 is characterized by the load switch assembly 114 providing a freewheel path for electric current $i_L$ flowing through inductor 110 in response to control switching device 112 switching from its on-state to its off-state. The blocking state of a load switch assembly 114 is characterized by the load switch assembly 114 preventing flow of electric current $i_p$ (either positive or negative polarity) through the load switch assembly 114 to its respective port 116. In this document, a "freewheel path" refers to a path for electric current flowing through an inductor when a control switch electrically coupled to the inductor is in its off-state. For example a freewheel path for electric current $i_L$ flowing through inductor 110 is a path for electric current $i_L$ when control switching device 112 is in its off-state. Additionally, in this document, a switching device is in its "on-state" when the switching device is being controlled to be in its conductive state, and a switching device is in its "off-state" when the switching device is being controlled to be in its non-conductive state.

Causing a given load switch assembly 114 to provide a freewheel path for electric current $i_L$ will also cause the load switch assembly 114 to provide electric power to its respective port 116, due to electric current from the inductor flowing through the load switch assembly. Accordingly, controller 118 is configured to selectively control provisioning of electric power to ports 116 by controlling states of load switch assemblies 114. For example, controller 118 may allow flow of electric current $i_p$ to a given port 116 by causing its respective load switch assembly 114 to operate in its freewheel state, thereby providing electric power to the port 116. As another example, controller 118 may prevent flow electric current $i_p$ to a given port 116 by causing its respective load switch assembly 114 to operate in its blocking state, such that electric power is not provided to the port. Additionally, one load switch assembly 114 needs to be operating in its freewheel state at any given time while multi-port power converter 102 is operating, to ensure that there is an available freewheel path for electric current $i_L$ flowing through inductor 110, as required for proper operation of multi-port power converter 102. Accordingly, particular embodiments of controller 118 are configured to generate control signals $\phi_s$ and $\phi_s'$ such that solely one load switch assembly 114 operates in its freewheel state, and all other load switch assemblies 114 operate in their blocking states, at any given time.

Additionally, some embodiments of controller 118 are configured to generate control signals $\phi_s$ and $\phi_s'$ to change which load switch assembly 114 operates in its freewheel state, to change which port 116 (and associated load 106) is powered by multi-port power converter 102. For example, assume that it is desired that multi-port power converter 102 provide electric power to port 116(1) for powering load 106(1). In such case, controller 118 may generate control signals $\phi_s$ and $\phi_s'$ to (a) cause load switch assembly 114(1) to operate in its freewheel state and (b) cause all other load switch assemblies 114(2)-114(N) to operate in their blocking states. As such, electric current $i_p(1)$ would flow through load switch assembly 114(1) to port 116(1), and multi-port power converter 102 would thereby provide electric power to port 116(1) and associated load 106(1). Additionally, load switch assembly 114(1) would provide a freewheel path for electric current $i_L$ flowing through inductor 110. However, load switch assemblies 114(2)-114(N) would prevent flow of electric currents $i_p(2)$-$i_p(N)$, respectively, such that ports 116(1)-116(N), and associated loads 106(1)-106(N), would not be powered by multi-port power converter 102.

It may be desirable in some situations to provide electric power to two or more ports 116, such as for powering two or more loads 106. Accordingly, certain embodiments of controller 118 are configured to generate control signals $\phi_s$ and $\phi_s'$ in a manner that causes two or more load switch assemblies 114 to be in their freewheel states in an alternating manner, such as by alternating which load switch assembly 114 is in its freewheel state at each switching cycle of multi-port power converter 102, or at each multiple of two or more switching cycles of multi-port power converter 102. For example, assume that it desired that multi-port power converter 102 provide electric power to each of port 116(1) and port 116(2). In such case controller 118, may be configured to (a) cause load switch assembly 114(1) to be in its freewheel state, and all other load switch assemblies 114 to be in their blocking states, during odd switching cycles of multi-port power converter 102, and (b) cause load switch assembly 114(2) to be in its freewheel state, and all other load switch assemblies 114 to be in their blocking states, during even switching cycles of multi-port power converter 102. As such, multi-port power converter 102 would provide electric power to port 116(1) during odd switching cycles, and multi-port power converter 102 would provide electric power to port 116(2) during even switching cycles. Additionally, load switch assembly 114(1) would provide a freewheel path for electric current $i_L$ during odd switching cycles, and load switch assembly 114(2) would provide a freewheel path for electric current in during even switching cycles.

In particular embodiments, controller 118 is configured to generate control signals $\phi_s$ and $\phi_s'$ to cause a given load switch assembly 114 to operate in its freewheel state by performing the following actions: (a) causing the respective switching device 124 of the switching assembly to switch from its off-state to its on-state in response to control switching device 112 switching from its on-state to its off-state, to provide a freewheel path for electric current $i_L$, (b) limiting operation of switching device 124 of the load switch assembly in its on-state solely to when control switching device 112 is in its off-state, to prevent shorting of ports 116 to ground, and (c) causing the respective switching device 126 of the switching assembly to continuously operate in its on-state to the provide a path for electric current $i_p$ through the load switch assembly. Additionally, in some embodiments, controller 118 is configured to generate control signals $\phi_s$ and $\phi_s'$ to cause a given load switch assembly 114 to operate in its blocking state by causing each of the respective switching device 124 of the load switch assembly and the respective switching device 126 of the load switch assembly to continuously operate in its off-state, to block flow of positive or negative polarity electric current $i_p$ through the load switch assembly. Roles of switching device 124 and switching device 126 in a given load switch assembly 114 could be swapped without changing operation of the load switch assembly. Controller 118 is optionally configured to prevent continuous current conduction at light loads by generating control signals $\phi_s$ and $\phi_s'$ in a manner which terminates a freewheel path for electric current $i_L$ flowing through inductor 110 when magnitude of electric current $i_L$ crosses zero.

It should be noted that electric current need only flow through three switching devices when powering a given port 116 of multi-port power converter 102. For example, consider a scenario where controller 118 is generating control signals such that multi-port power converter 102 provides electric power to port 116(1). In this scenario, electric current need only flow through control switching device 112, switching device 124(1), and switching device 126(1), which promotes high efficiency of multi-port power converter 102 by helping minimize forward voltage drop across switching devices.

Figure 2:
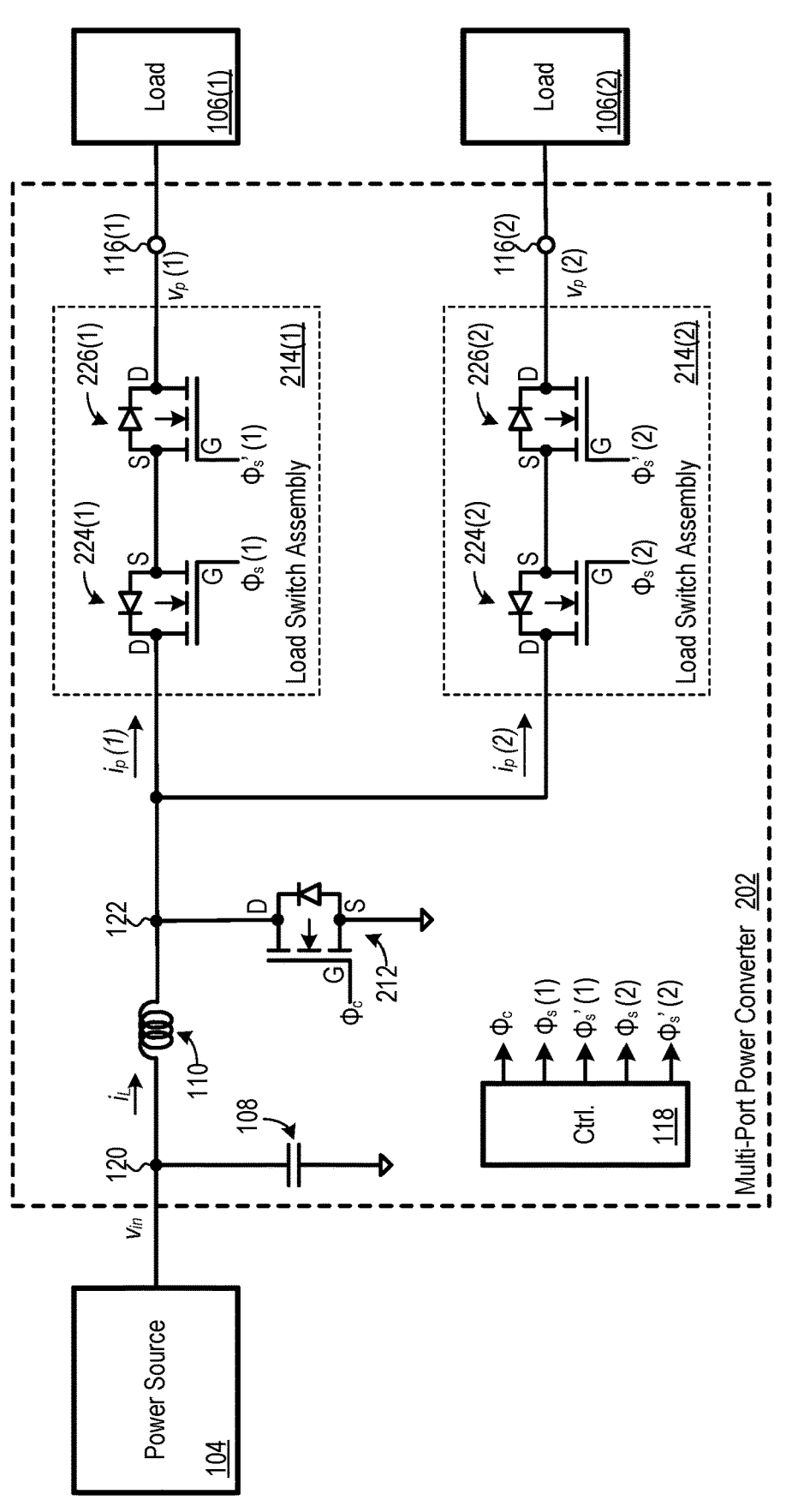
FIG. 2 is a schematic diagram of an embodiment of the FIG. 1 electrical system where the multi-port power converter includes two ports.
Figures 3A, 3B, 3C, 3D, 3E, 3F:
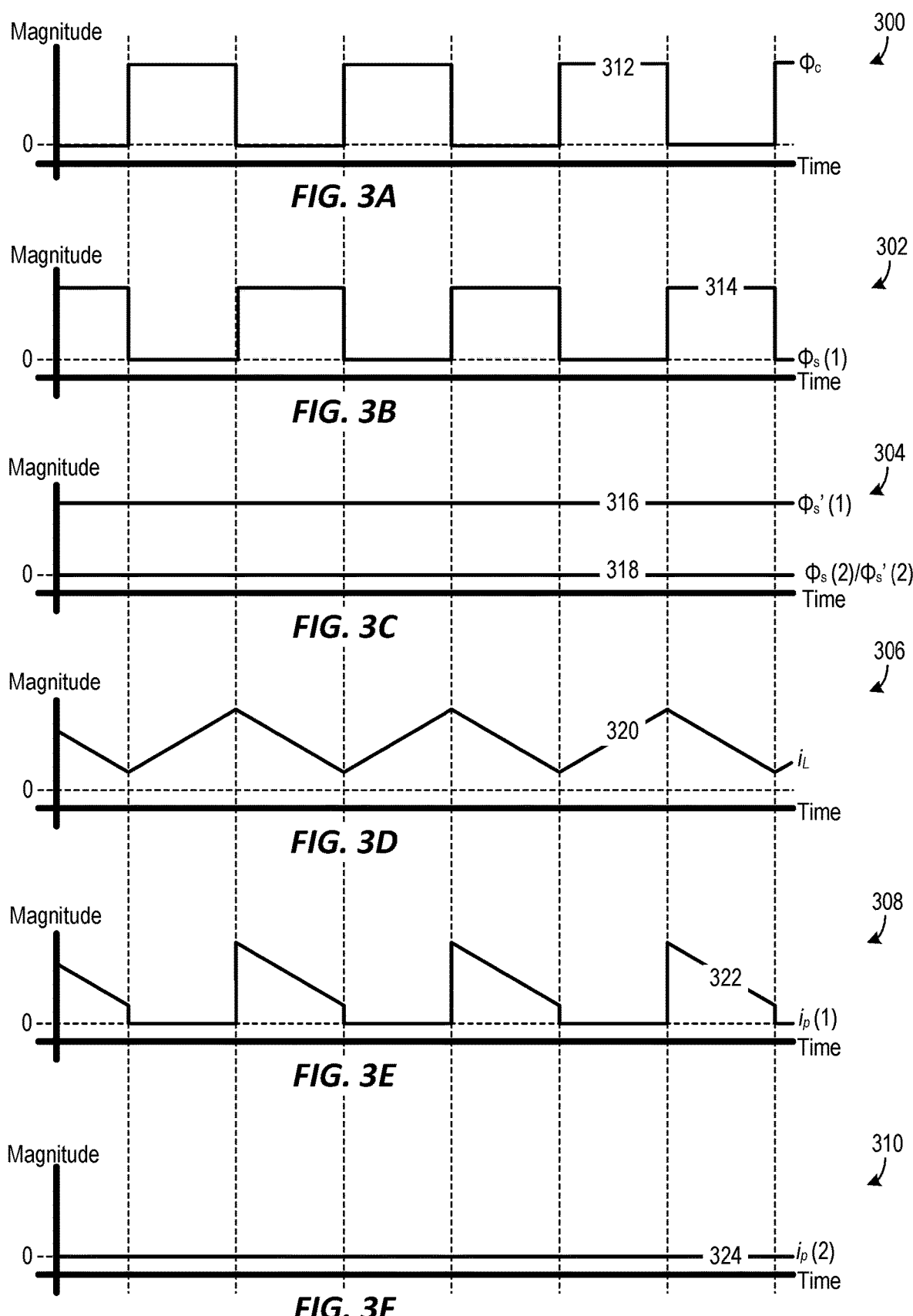
FIGS. 3A, 3B, 3C, 3D, 3E, and 3F are graphs collectively illustrating one example of operation of the FIG. 2 multi-port power converter where a first load switch assembly operates in its freewheel state.
Figures 4A, 4B, 4C, 4D, 4E, 4F:
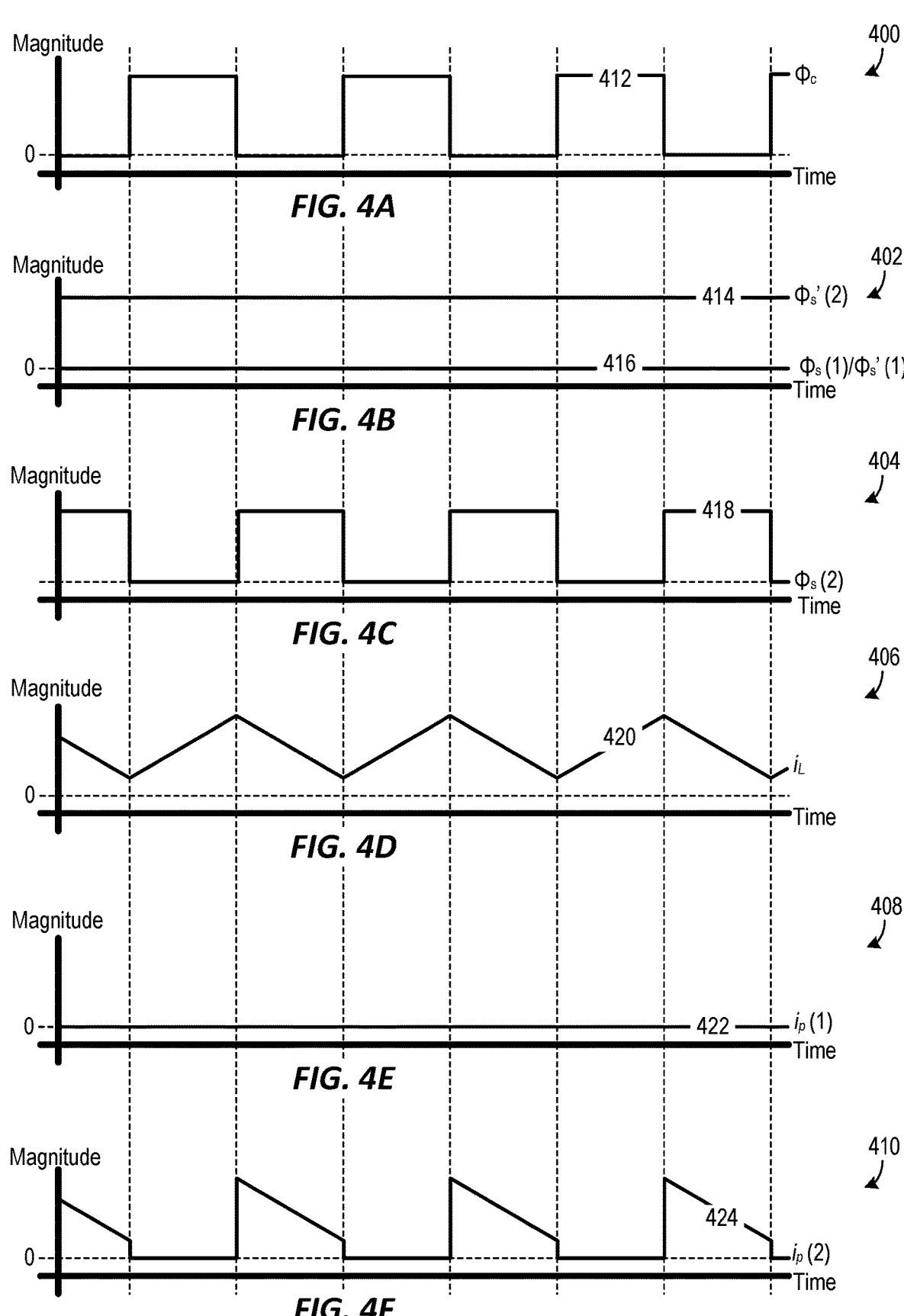
FIGS. 4A, 4B, 4C, 4D, 4E, and 4F are graphs collectively illustrating one example of operation of the FIG. 2 multi-port power converter where a second load switch assembly operates in its freewheel state.

FIG. 2 is schematic diagram of an electrical system 200, which is an embodiment of electrical system 100 of FIG. 1 where N is equal to two. Multi-port power converter 102 of FIG. 1 is embodied by a multi-port power converter 202 in FIG. 2, where switching devices are implemented by FETs. In particular, control switching device 112 of multi-port power converter 102 is embodied by a FET 212 in multi-port power converter 202. A drain (D) of FET 212 is electrically coupled to first switching node 122, and a source (S) of FET 212 is electrically coupled to ground. A gate (G) of FET 212 is driven by control signal $\phi_c$.

Each switching device 124 and each switching device 126 of multi-port power converter 102 is embodied by a FET 224 and a FET 226, respectively, in multi-port power converter 202. Within each load switch assembly 214, FET 224 and FET 226 are connected in series in a manner which prevents electric current $i_p$ from flowing through the two FETs solely via their body diodes, to enable the load switch assembly to block flow of electric current $i_p$ having either a positive polarity or a negative polarity. In particular, the drain (D) of FET 224 is electrically coupled to first switching node 122, and the source(S) of FET 224 is electrically coupled to the source(S) of FET 226. Additionally, the drain (D) of FET 226 is electrically coupled to a respective port 116. However, the orientations of FETs 224 and FETs 226 could be swapped while still realizing the ability to block flow of electric current $i_p$ having either a positive polarity or a negative polarity. In particular, within each load switch assembly 214, the drain (D) of FET 224 could instead be connected to the drain (D) of FET 226, the source S of FET 224 could instead be connected to first switching node 122, and the source(S) of FET 226 could instead be connected to a respective port 116. The gate G of each FET 224 is driven by a respective control signal $\phi_s$, and the gate (G) of each FET 226 is driven by a respective control signal $\phi_s'$. FETs 212, 224, and 226 could be replaced with different types of FETS, or even with different types of transistors, without departing from the scope hereof.

Discussed below with respect to FIGS. 3A-3F, 4A-4F, and 5F-5F are several examples of operation of multi-port power converter 202 of FIG. 2. It is understood, however, that multi-port converter 202 is not limited to operating according to these examples.

FIGS. 3A-3F are graphs 300, 302, 304, 306, 308, and 310, respectively, of magnitude versus time where (a) controller 118 is causing load switch assembly 114(1) to operate in its freewheel state and (b) controller 118 is causing load switch assembly 114(2) to operate in its blocking state. Graphs 300, 302, 304, 306, 308, and 310 share a common time base, as shown by the dashed vertical lines connecting the graphs.

Graph 300 includes a curve 312 representing control signal $\phi_c$ controlling FET 212, and graph 302 includes a curve 314 representing control signal $\phi_s(1)$ controlling FET 224(1). Graphs 304 includes a curve 316 representing control signal $\phi_s'(1)$ controlling FET 226(1) and a curve 318 representing each of control signals $\phi_s(2)$ and $\phi_s'(2)$ controlling FETs 224(2) and 226(2), respectively. Control signals $\phi_s(2)$ and $\phi_s'(2)$ are the same in this example, and these two control signals are therefore represented by common curve 318. While each of control signals $\phi_c$, $\phi_s(1)$, $\phi_s'(1)$, $\phi_s(2)$, and $\phi_s'(2)$ is asserted when in a logic high state in the example of FIGS. 3A-3F, one or more of these controls signals could have a different polarity without departing from the scope hereof. Graph 306 includes a curve 320 representing electric current $i_L$. Graph 308 includes a curve 322 representing electric current $i_p(1)$ flowing through load switch assembly 114(1), and graph 310 includes a curve 324 representing current $i_p(2)$ through load switch assembly 114(2).

Multi-port power converter 202 operates at 50 percent duty cycle and at a constant frequency in the example of FIGS. 3A-3F. However, duty cycle and frequency of multi-port power converter 202 will vary as a function of implementation and/or operating conditions. Controller 118 generates control signal $\phi_s(1)$ such that control signal $\phi_s(1)$ is asserted in response to control signal $\phi_c$ being de-asserted, to provide a freewheel path for current $i_L$ as current $i_p(1)$ through load switch assembly 214(1), as illustrated in graphs 301, 302, 306, and 308. Additionally, control signal $\phi_s(1)$ is not asserted while control signal $\phi_c$ is asserted, to prevent shorting port 116(1) to ground. Furthermore, controller 318 generates control signal $\phi_s'(1)$ such that the control signal is always asserted, as illustrated in graph 304. Consequently, load switch assembly 114(1) not only provides a freewheel path for electric current $i_L$, but load switch assembly 114(1) provides power to port 116(1), in this example. Controller 118 additionally generates control signal $\phi_s(2)$ and control signal $\phi_s'(2)$ such that each of these two control signals is de-asserted, as illustrated in graph 304, and electric current $i_s(2)$ through load switching assembly 114(2) is therefore zero, as illustrated in graph 310. Some embodiments of controller 118 are configured such that control signal $\phi_c$ is de-asserted before any control signal $\phi_s$ is asserted, and vice versa, to help prevent simultaneous conduction of FET 212 and a FET 224.

FIGS. 4A-4F are graphs 400, 402, 404, 406, 408, and 410, respectively, of magnitude versus time where (a) controller 118 is causing load switch assembly 114(2) to operate in its freewheel state and (b) controller 118 is causing load switch assembly 114(1) to operate in its blocking state. Graphs 400, 402, 404, 406, 408, and 410 share a common time base, as shown by the dashed vertical lines connecting the graphs.

Graph 400 includes a curve 412 representing control signal $\phi e$ controlling FET 212, and graph 402 includes a curve 414 representing control signal $\phi_s'(2)$ controlling FET 226(2). Graph 402 further includes a curve 416 representing each of control signals $\phi_s(1)$ and $\phi_s'(1)$ controlling FETs 224(1) and 226(1), respectively. Control signals $\phi_s(1)$ and $\phi_s'(1)$ are the same in the example of FIGS. 4A-4F, and these two control signals are therefore represented by common curve 416. Graph 406 includes a curve 420 representing electric current $i_L$. Graph 408 includes a curve 422 representing electric current $i_s(1)$ flowing through load switch assembly 114(1), and graph 410 includes a curve 424 representing electric current $i_s(2)$ through load switch assembly 114(2). In contrast to the example of FIGS. 3A-3F, load switch assembly 114(2) provides a freewheeling path for electric current $i_L$, as illustrated in graph 410. Additionally, electric current is (1) through load switching assembly 114(1) is zero, as illustrated in graph 408.

FIGS. 5A-5F are graphs 500, 502, 504, 506, 508, and 510, respectively, of magnitude versus time where controller 118 causes load switch assembly 214(1) and load switch assembly 214(2) to alternately operate in their freewheel states, so that multi-port power converter 202 provides electric power to each of port 116(1) and port 116(2). Graphs 500, 502, 504, 506, 508, and 510 share a common time base, as shown by the dashed vertical lines connecting the graphs.

Graph 500 includes a curve 512 representing control signal e controlling FET 212. Graph 502 includes a curve 514 representing control signal $\phi_s(1)$ controlling FET 224

(1), and graph 504 includes a curve 516 representing control signal $\phi_s(1)$ controlling FET 224(2). Graph 506 includes a curve 518 representing electric current $i_L$. Graph 508 includes a curve 520 representing electric current $i_p(1)$ flowing through load switch assembly 114(1), and graph 510 includes a curve 522 representing electric current $i_p(2)$ through load switch assembly 114(2). Control signals $\phi_s'(1)$ and $\phi_s'(2)$ are not shown in FIGS. 5A-5F. However, control signal $\phi_s'(1)$ is asserted at least whenever control signal $\phi_s(1)$ is asserted, and control signal $\phi_s'(2)$ is asserted at least whenever control signal $\phi_s(2)$ is asserted. Control signal $\phi_s'(1)$, though, is de-asserted whenever load switch assembly 214(1) is in its blocking state, and control signal $\phi_s'(2)$ is de-asserted whenever load switch assembly 214(2) is in its blocking state.

Controller 118 is configured to generate control signals $\phi_s(1)$, $\phi_s'(1)$, $\phi_s(2)$, and $\phi_s'(2)$ in the example of FIGS. 5A-5F such that (a) load switch assembly 214(1) operates in its freewheel state, and load switch assembly 214(2) operates in it blocking state, during odd switching periods of multi-port power converter 202, e.g., during switching periods $t_1$ and $t_3$, and (b) load switch assembly 214(2) operates in its freewheel state, and load switch assembly 214(1) operates in it blocking state, during even switching periods of multi-port power converter 202, e.g., during switching period 12. As such, multi-port power converter 202 provides electric power to port 116(1) during odd switching periods, and multi-port power converter 202 provides electric power to port 116(2) during even switching periods. Additionally, load switch assembly 114(1) provides a freewheel path for electric current $i_L$ during odd switching periods, and load switch assembly 114(2) provides a freewheel path for electric current $i_L$ during even switching periods.

Figure 6:
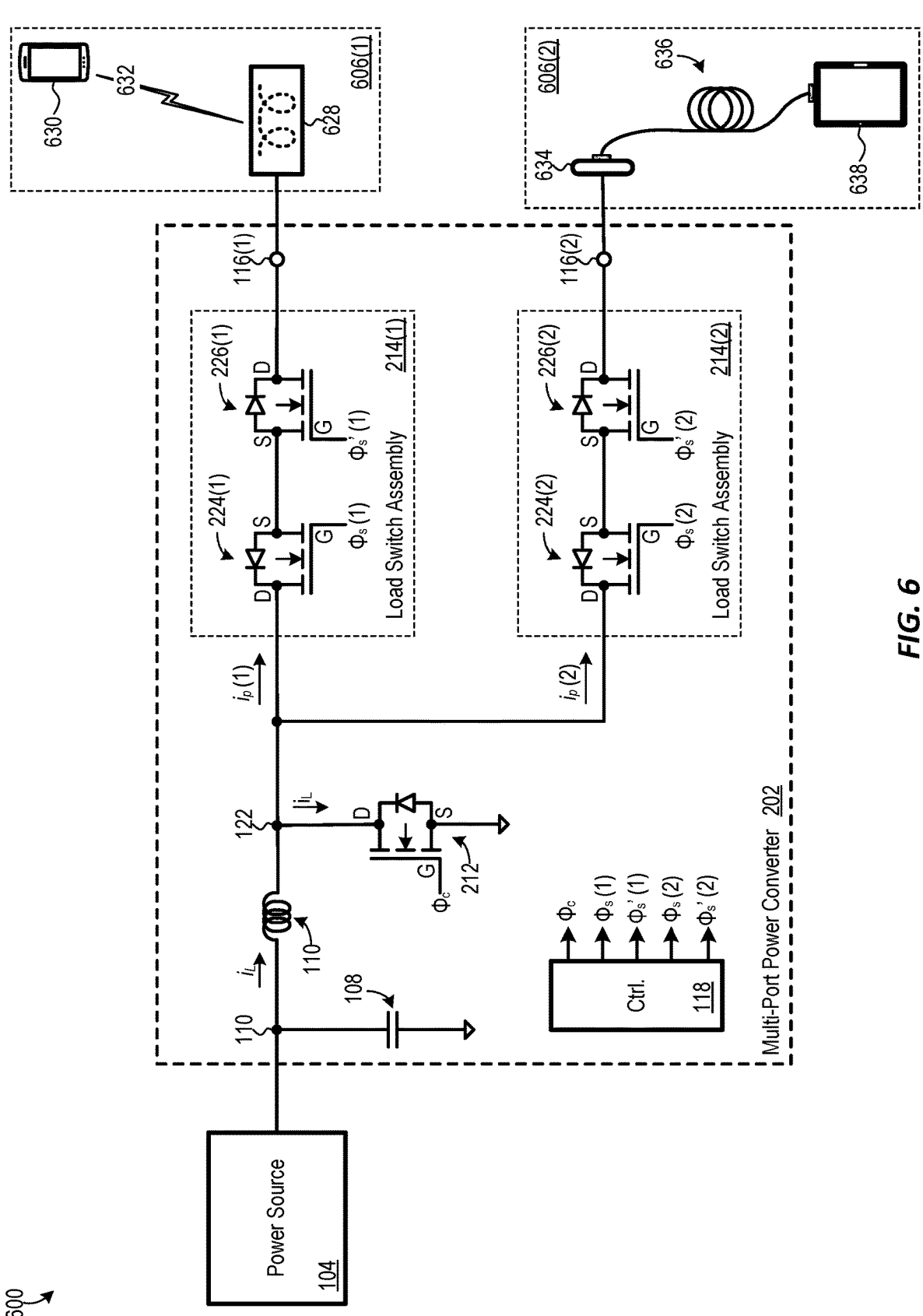
FIG. 6 is a schematic diagram of an embodiment of the FIG. 2 electrical system including a wireless power transfer interface and a wired power transfer interface.

FIG. 6 is a schematic diagram of an electrical system 600, which is an embodiment of electrical system 200 of FIG. 2 where load 106(1) and load 106(2) are embodied by a load 606(1) and a load 606(2). Load 606(1) includes a wireless power transfer interface 628 and a mobile telephone 630. Port 116(1) is electrically coupled to wireless power transfer interface 628, and wireless power transfer interface 628 is configured to generated a magnetic field 632 for wirelessly charging mobile telephone 630. Wireless power transfer interface 628 includes, for example, a resonant coil. Load 606(2) includes a Universal Serial Bus (USB) interface 634, an electrical cable 636, and a tablet computer 638. Tablet computer 638 receives electric power from multi-port power converter 202 via USB interface 634 and electrical cable 636. USB interface 634 could be replaced with another type of wired power transfer interface, such as a Power Over Ethernet interface, without departing from the scope hereof.

Figure 7:
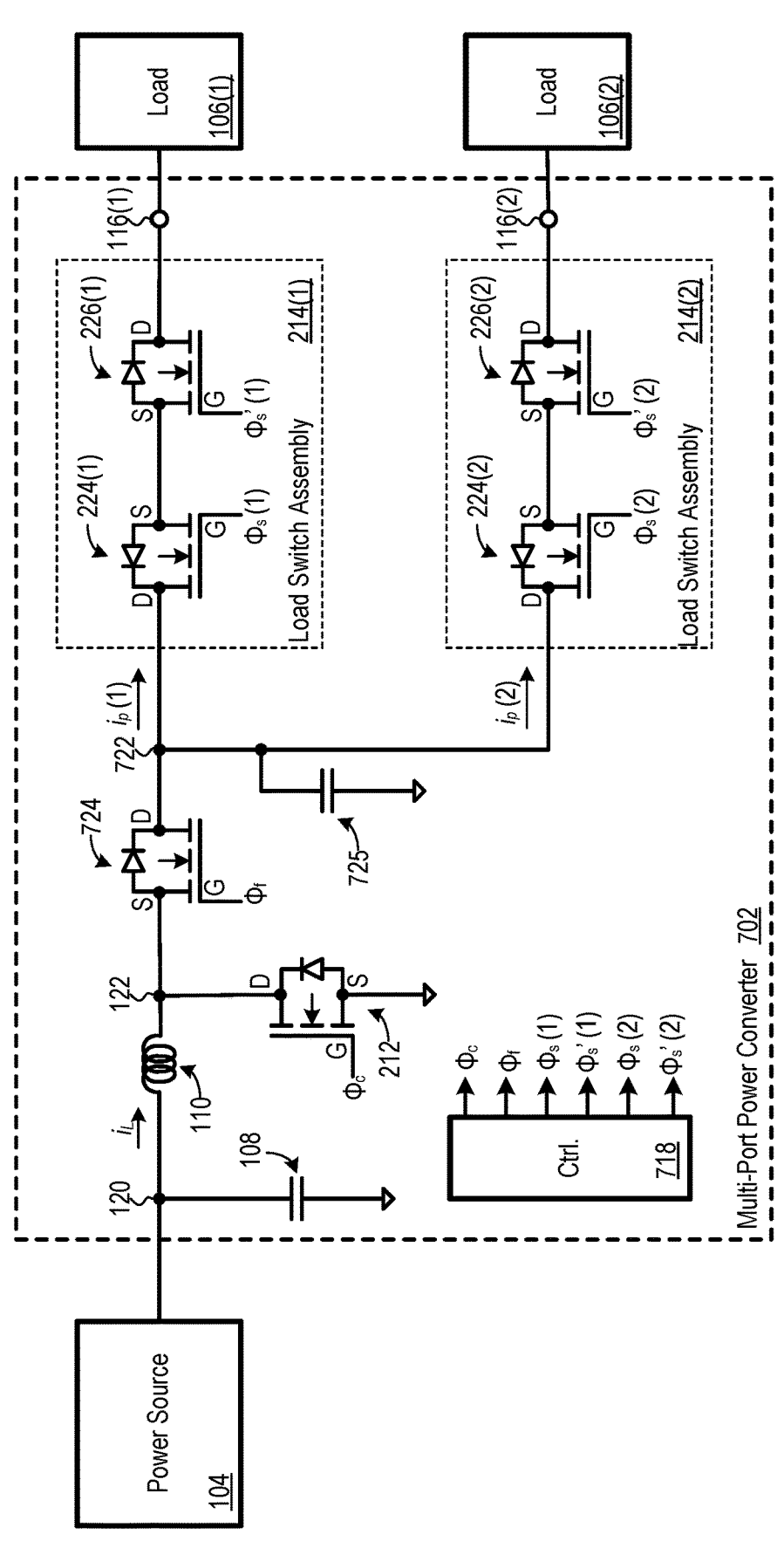
FIG. 7 is a schematic diagram of an alternate embodiment of the FIG. 2 electrical system including a multi-port power converter with a freewheel switching device.
Figures 8A, 8B, 8C, 8D, 8E, 8F, 8G:
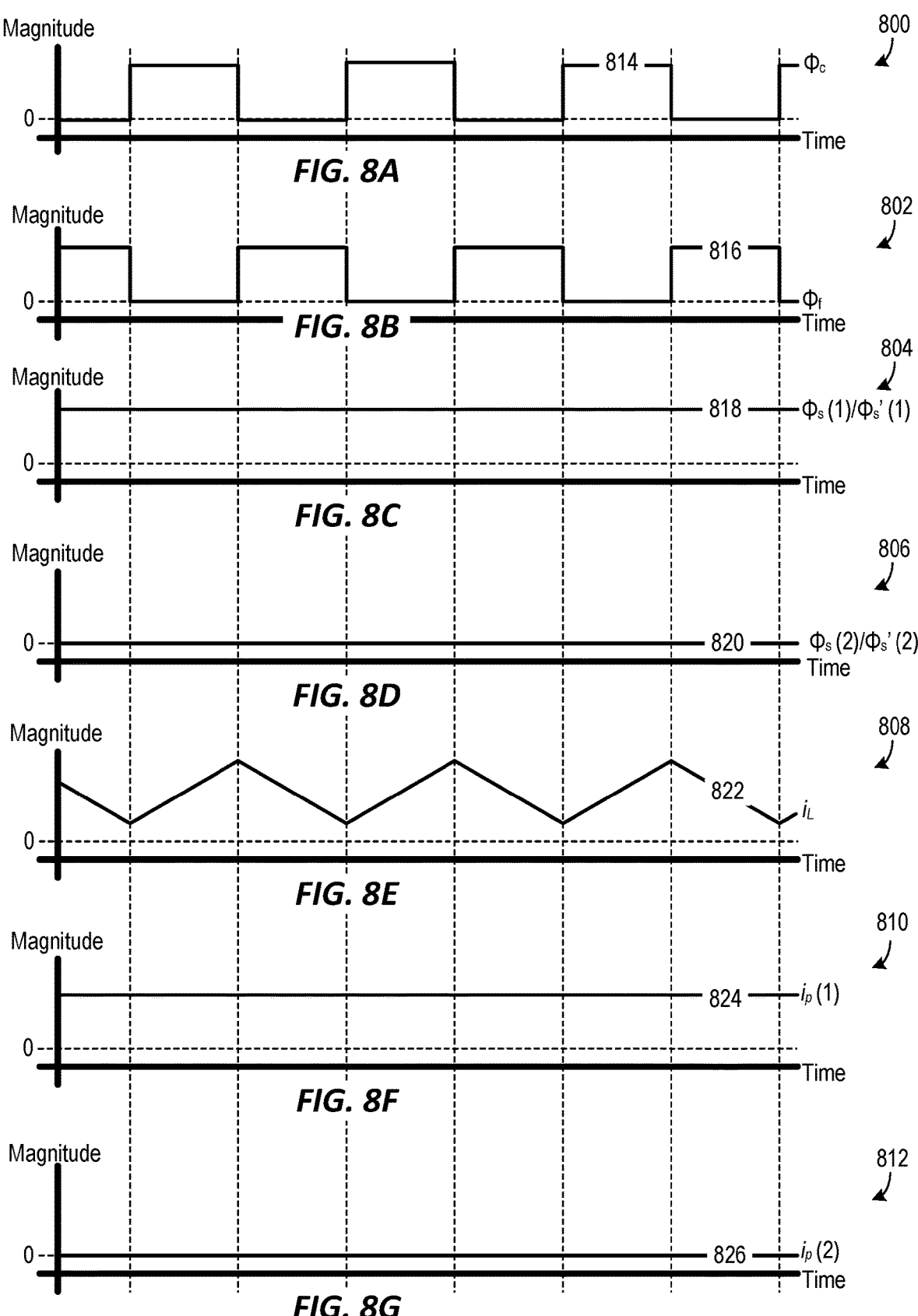
FIGS. 8A, 8B, 8C, 8D, 8E, 8F, and 8G are graphs collectively illustrating one example of operation of the FIG. 7 multi-port power converter where a first load switch assembly operates in its freewheel state.
Figures 9A, 9B, 9C, 9D, 9E, 9F, 9G:
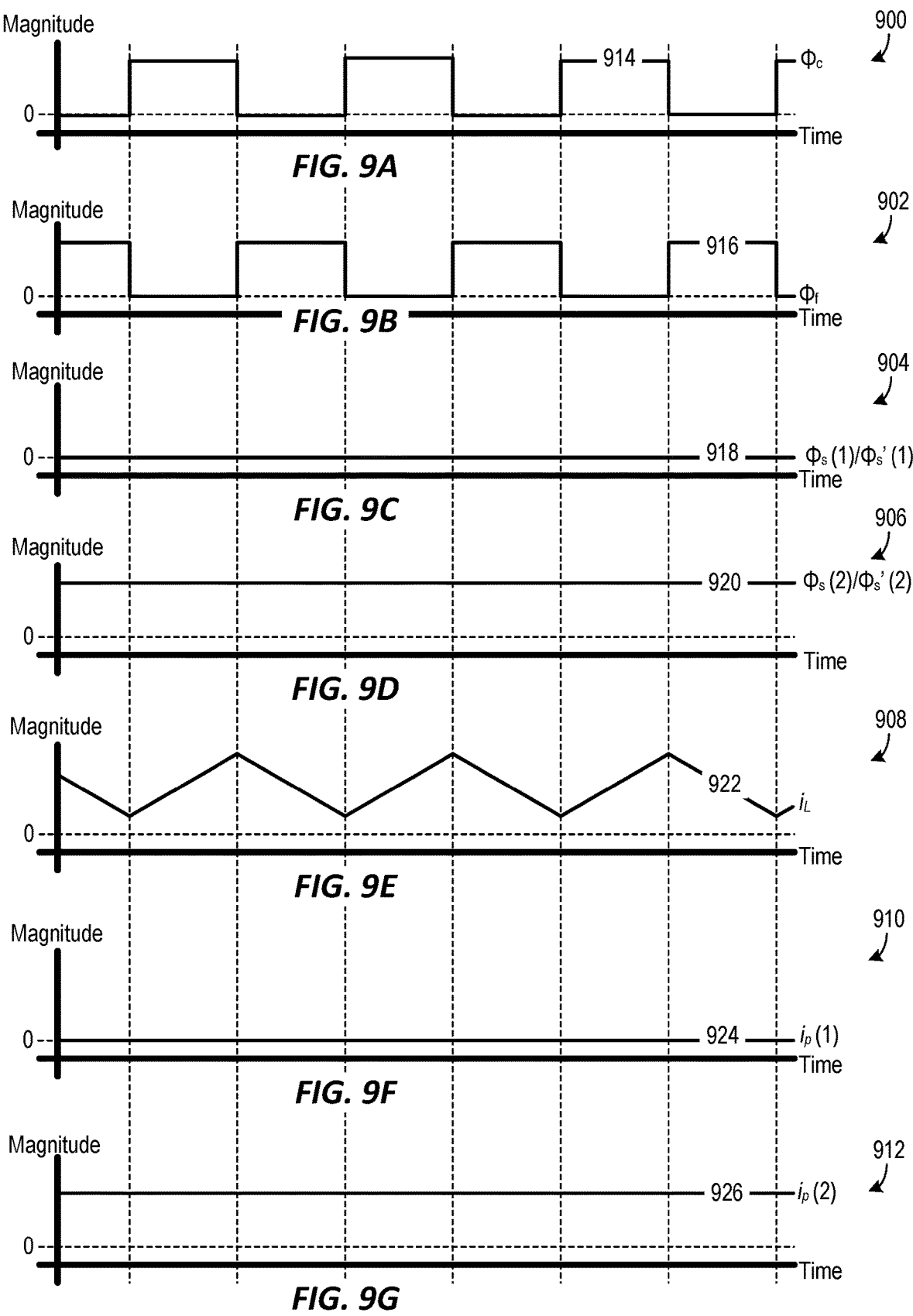
FIGS. 9A, 9B, 9C, 9D, 9E, 9F, and 9G are graphs collectively illustrating one example of operation of the FIG. 7 multi-port power converter where a second load switch assembly operates in its freewheel state.

Referring again to FIG. 1, any of the multi-port power converters disclosed herein could be modified to further include a dedicated freewheel switching device. For example, FIG. 7 is a schematic diagram of an electrical system 700, which is an alternate embodiment of electrical system 200 of FIG. 2 including a multi-port power converter 702 in place of multi-port power converter 202. Multi-port power converter 702 is like multi-port power converter 202 except that multi-port power converter 702 further includes a freewheel FET 724 and a capacitor 725. Additionally, multi-port power converter 702 includes a controller 718 in place of controller 118. Freewheel FET 724 is electrically coupled between first switching node 122 and an output node 722, and freewheel FET 724 is controlled by a control signal $\phi_f$. Each load switch assembly 214 is electrically coupled between output node 722 and a respective port 116, in multi-port power converter 702. Capacitor 725 is electrically coupled between output node 722 and ground, and capacitor 725 is configured, for example, to provide a path for output ripple current generated by multi-port power converter 702.

Controller 718 is similar to controller 118 but controller 718 is further configured to generate control signal $\phi_f$. In some embodiments, controller 718 is configured to generate control signal $\phi_f$ such that it is complementary to control signal $\phi_c$, with optional deadtime between control signal $\phi_c$ being de-asserted and control signal $\phi_f$ being asserted, and vice versa. However, in some other embodiments, controller 718 is configured to generate control signal $\phi_c$ in manner which prevents continuous conduction at light loads by de-asserting control signal $\phi_f$ in response to magnitude of current $i_L$ crossing zero.

Discussed below with respect to FIGS. 8A-8G and 9A-9G are two examples of operation of multi-port power converter 702 of FIG. 7. It is understood, however, that multi-port power converter 702 is not limited to operating according to these examples.

FIGS. 8A-8G are graphs 800, 802, 804, 806, 808, 810, and 812, respectively, of magnitude versus time where (a) controller 718 is causing load switch assembly 114(1) to operate in its freewheel state and (b) controller 718 is causing load switch assembly 114(2) to operate in its blocking state. Graphs 800, 802, 804, 806, 808, 810, and 812 share a common time base, as shown by the dashed vertical lines connecting the graphs.

Graph 800 includes a curve 814 representing control signal $\phi_c$ controlling FET 212, and graph 802 includes a curve 816 representing control signal $\phi_f$ controlling freewheel FET 724. Control signal $\phi_f$ is essentially complementary to control signal $\phi_c$ in this example. Graph 804 includes a curve 818 representing each of control signal $\phi_s(1)$ and $\phi_s{}'(1)$. While load switch assembly 214(1) provides a freewheel path for current $i_L$ in this example, freewheel FET 724 isolates ports 116 from ground whenever FET 212 is in its on-state. Consequently, there is no need for FET 224(1) to be in its off-state when control switching device 212 is in its on-state, and control signals $\phi_s(1)$ and $\phi_s{}'(1)$ are therefore continuously asserted in this example. Graph 806 includes a curve 820 representing each of control signal $\phi_s(2)$ and $\phi_s{}'(2)$, and each of these two control signals is de-asserted because load switch assembly 114(2) is in its blocking state. Graph 808 includes a curve 822 representing electric current $i_L$. Graph 810 includes a curve 824 representing electric current $i_s(1)$ flowing through load switch assembly 114(1), and graph 812 includes a curve 826 representing current $i_s(2)$ through load switch assembly 114(2). It should be noted that electric current $i_s(1)$ is essentially devoid of ripple due to presence of capacitor 725.

FIGS. 9A-9G are graphs 900, 902, 904, 906, 908, 910, and 912, respectively, of magnitude versus time where (a) controller 718 is causing load switch assembly 114(1) to operate in its blocking state and (b) controller 718 is causing load switch assembly 114(2) to operate in its freewheel state. Graphs 900, 902, 904, 906, 908, 910, and 912 share a common time base, as shown by the dashed vertical lines connecting the graphs.

Graph 900 includes a curve 914 representing control signal $\phi_c$ controlling FET 212, and graph 902 includes a curve 916 representing control signal $\phi_f$ controlling freewheel FET 724. Control signal $\phi_f$ is essentially complementary to control signal $\phi_c$ in this example. Graph 904 includes a curve 918 representing each of control signals $\phi_s(1)$ and $\phi_s{}'(1)$, which are continuously de-asserted due to load switch assembly 214(1) operating in its blocking state. Graph 906 includes a curve 920 representing each of control signal $\phi_s(2)$ and $\phi_s{}'(2)$, and each of these two control signals is continuously asserted because load switch assembly 114(1) is in its freewheel state and freewheel FET 724 prevents shorting of port 116(2) to ground. Graph 908 includes a curve 922 representing electric current $i_L$. Graph 910 includes a curve 924 representing electric current $i_p(1)$ flowing through load switch assembly 114(1), and graph 912 includes a curve 926 representing current $i_s(2)$ through load switch assembly 114(2).

Figure 10:
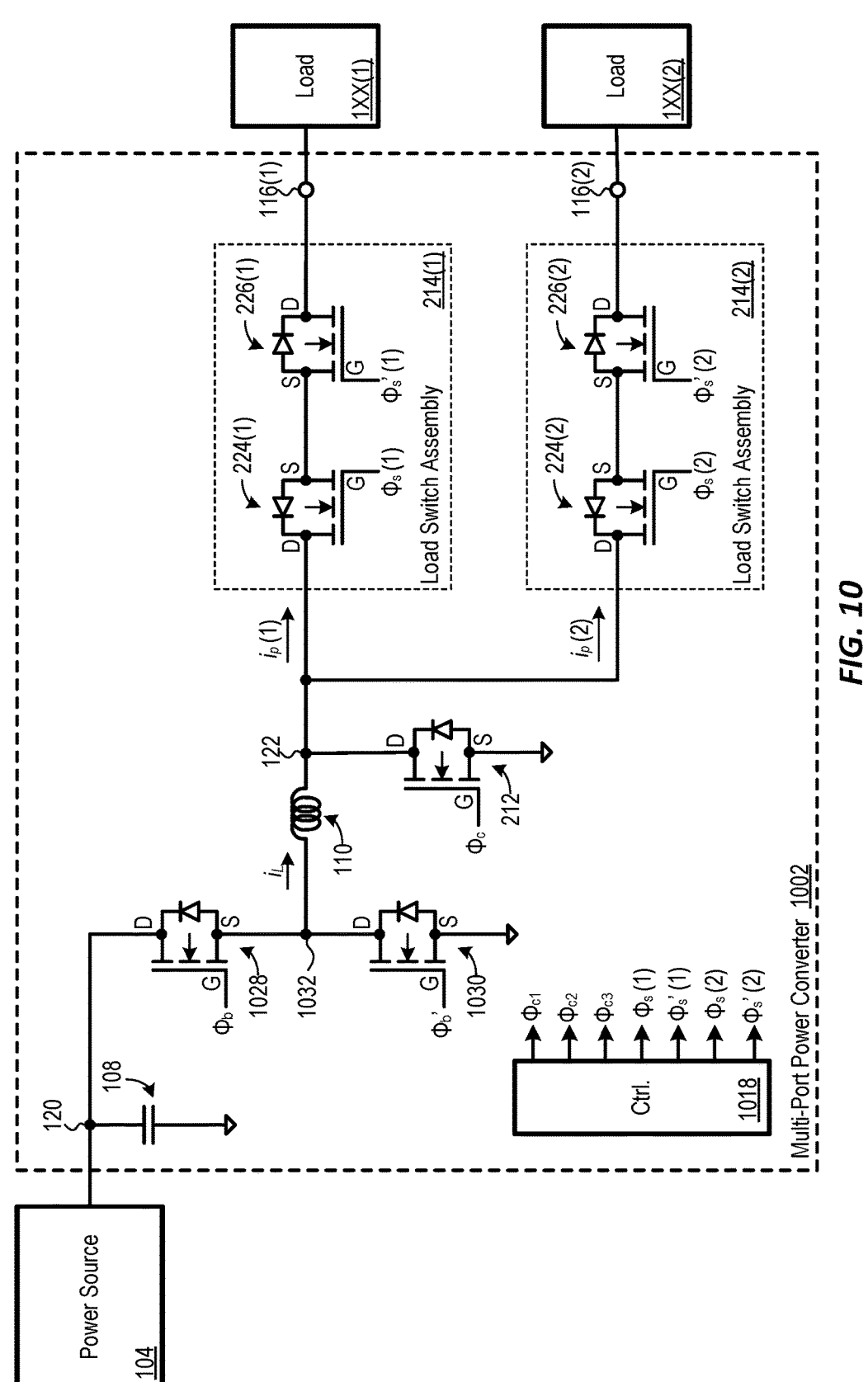
FIG. 10 is a schematic diagram of an alternate embodiment of the FIG. 2 electrical system including a multi-port power converter having a buck and boost topology.
Figures 12A, 12B, 12C, 12D, 12E, 12F, 12G, 12H:
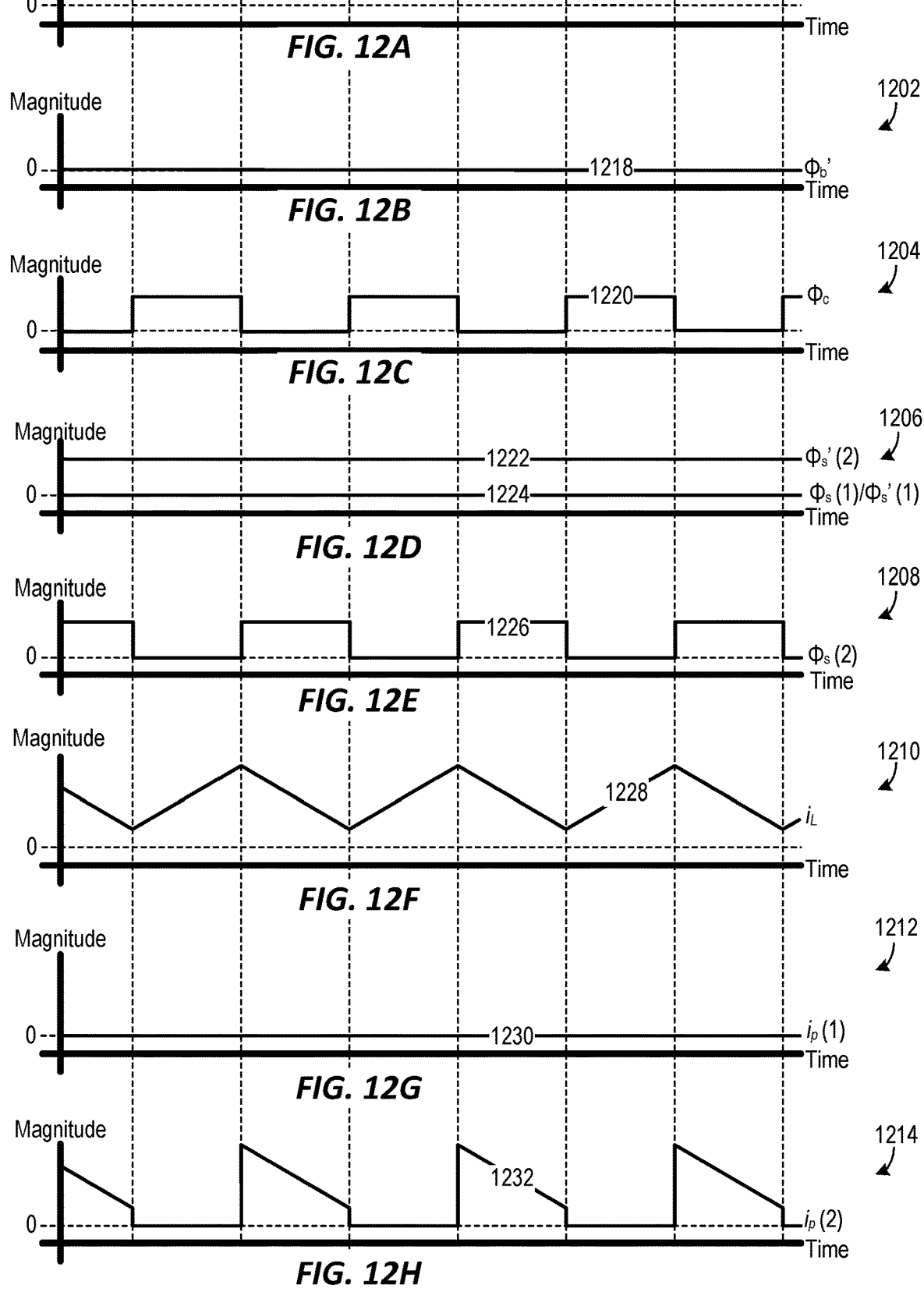
FIGS. 12A, 12B, 12C, 12D, 12E, 12F, 12G, and 12H are graphs collectively illustrating another example of operation of the FIG. 10 multi-port power converter operating as a boost converter.
Figures 13A, 13B, 13C, 13D, 13E, 13F, 13G, 13H:
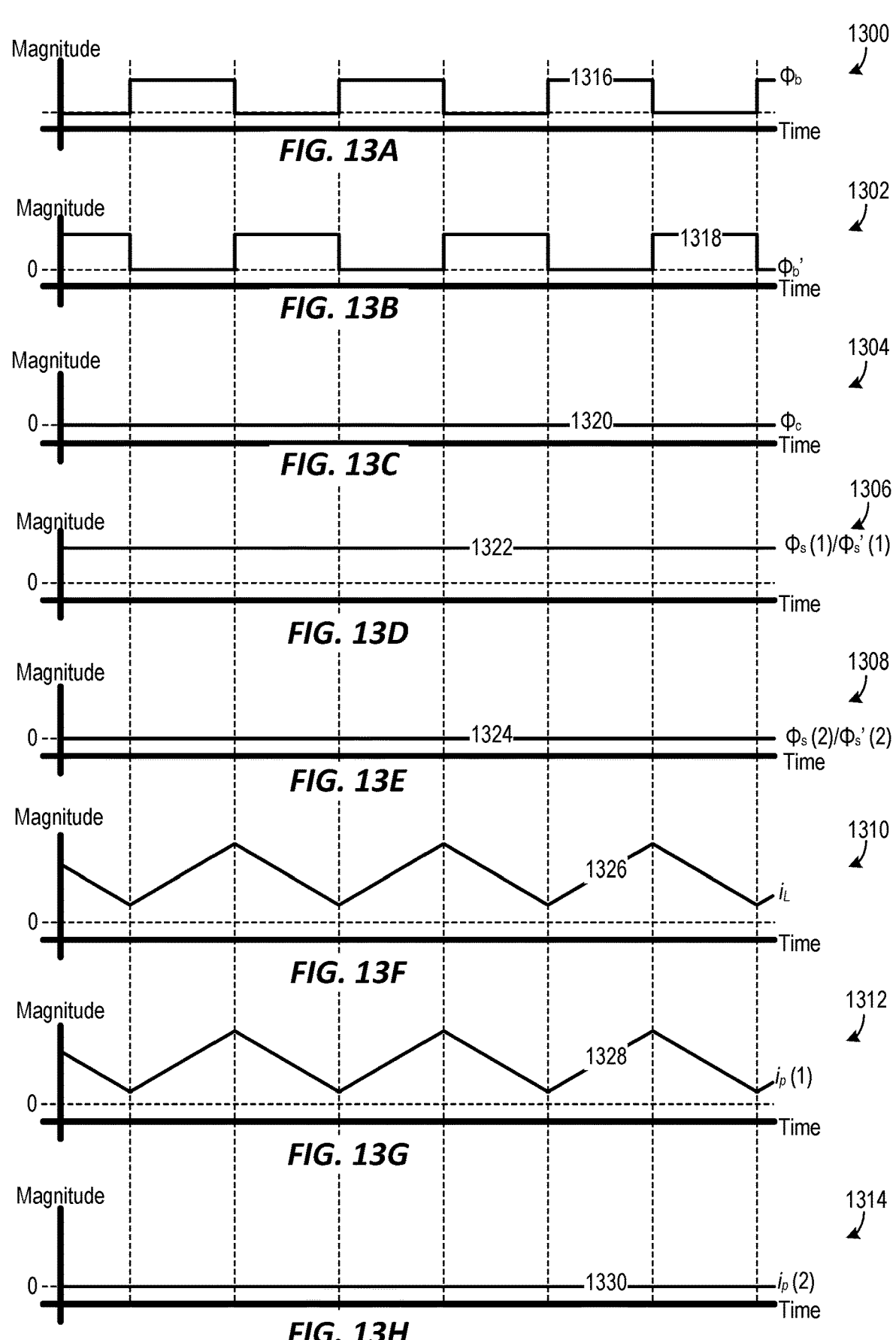
FIGS. 13A, 13B, 13C, 13D, 13E, 13F, 13G, and 13H are graphs collectively illustrating one example of operation of the FIG. 10 multi-port power converter operating as a buck converter.
Figures 14A, 14B, 14C, 14D, 14E, 14F, 14G, 14H:
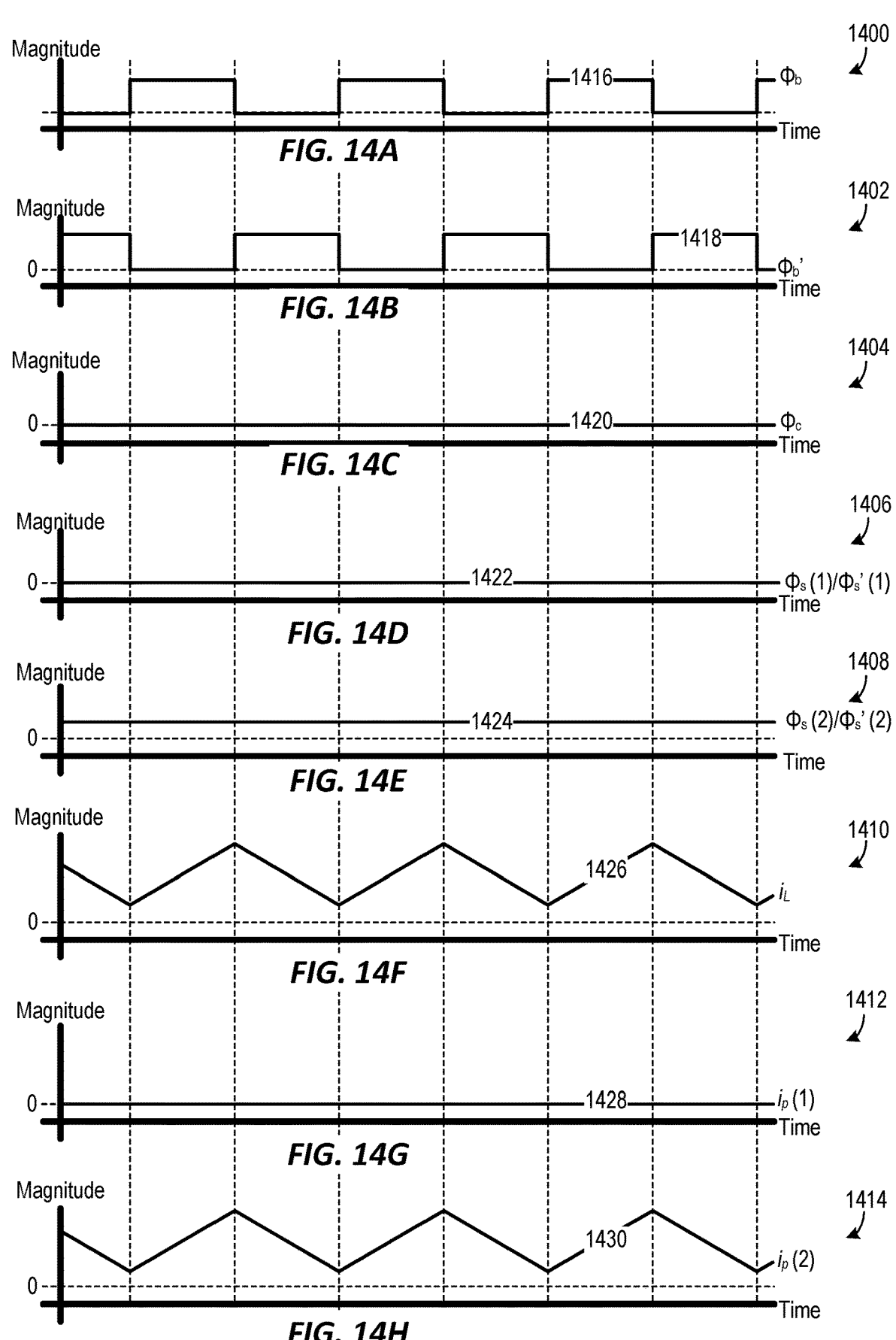
FIGS. 14A, 14B, 14C, 14D, 14E, 14F, 14G, and 14H are graphs collectively illustrating another example of operation of the FIG. 10 multi-port power converter operating as a buck converter.

While the multi-port power converters discussed above have a boost topology, the new multi-port power converters disclosed herein can have other topologies. For example, FIG. 10 is a schematic diagram of an electrical system 1000, which is an alternate embodiment of electrical system 200 of FIG. 2 including a multi-port power converter 1002 in place of multi-port power converter 202. Multi-port power converter 1002 is like multi-port power converter 202 except that multi-port power converter 1002 further includes a control FET 1028 and a freewheel FET 1030. Control FET 1028 is electrically coupled between input node 120 and a second switching node 1032, and freewheel FET 1030 is electrically coupled between second switching node 1032 and ground. Control FET 1028 is controlled by a control signal $\phi_b$, and freewheel FET 1030 is controlled by a control signal $\phi_b{}'$. Additionally, multi-port power converter 1002 includes a controller 1018 in place of controller 118. Controller 1018 is similar to controller 118, but controller 1018 is further configured to generate control signal $\phi_b$ and control signal $\phi_b{}'$.

Multi-port power converter 1002 has a buck and boost topology, and multi-port power converter 1002 can therefore operate either as buck converter or as a boost converter. Controller 1018 causes multi-port power converter 1002 to operate as a buck converter by (a) controlling flow of electric current through inductor 102 using control FET 1028, such as to regulate one or more parameters of multi-port power converter 1002 and (b) causing freewheel FET 1030 to provide a freewheel path for electric current $i_L$. Controller 1018 additionally causes FET 212 to continuously operate in its off-state when multi-port power converter 1002 operates a buck converter. Controller 1018 causes multi-port power converter 1002 to operate as a boost converter by (a) causing control FET 1028 to continuously operate in its on-state, (b) causing freewheel FET 1030 to continuously operate in its off-state, and (c) by otherwise controlling multi-power power converter 1002 in a manner analogous to how controller 118 controls multi-port power converter 202 of FIG. 2.

Discussed below with respect to FIGS. 11A-11H, 12A-12H, 13A-13H, and 14A-14H are four examples of operation of multi-port power converter 1002 of FIG. 10. It is understood, however, that multi-port power converter 1002 is not limited to operating according to these examples.

FIGS. 11A-11H are graphs 1100, 1102, 1104, 1106, 1108, 1110, 1112, and 1114, respectively, of magnitude versus time where (a) controller 1018 is causing multi-port power converter 1002 to operate as a boost converter, (b) controller 1018 is causing load switch assembly 214(1) to operate in its freewheel state, and (c) controller 1018 is causing load switch assembly 214(2) to operate in its blocking state. Graphs 1100, 1102, 1104, 1106, 1108, 1110, 1112, and 1114 share a common time base, as shown by the dashed vertical lines connecting the graphs.

Graph 1100 includes a curve 1116 representing control signal $\phi_b$, and graph 1102 includes a curve 1118 representing control signal $\phi_b{}'$. Control signal $\phi_b$ is continuously asserted, and control signal $\phi_b'$ is continuously de-asserted, which is consistent with multi-port power converter 1002 operating as a boost converter. Graph 1104 includes a curve 1120 representing control signal $\phi_c$, and graph 1106 includes a curve 1122 representing control signal $\phi_s(1)$. Control signal $\phi_s(1)$ is asserted in response to control signal $\phi_c$ being de-asserted, so that load switch assembly 214(1) provides as a freewheel path for electric current $i_L$. Additionally, control signal $\phi_s(1)$ is never asserted while control signal $\phi_c$ is asserted, to prevent shorting of port 116(1) to ground. Graph 1108 includes a curve 1124 representing control signal $\phi_s'(1)$, where the control signal is always asserted so multi-port power converter 1002 can provide power to port 116(1), as well as so that load switch assembly 214(1) can provide a freewheel path for electric current $i_L$. Graph 1108 additionally includes a curve 1126 representing each of control signal $\phi_s(2)$ and control signal $\phi_s'(2)$, which are continuously de-asserted due to load switch assembly 214(2) operating in its blocking state. Graph 1110 includes a curve 1128 representing electric current $i_L$. Graph 1112 includes a curve 1130 representing electric current $i_p(1)$ flowing through load switch assembly 214(1), and graph 1114 includes a curve 1132 representing electric current $i_p(2)$ flowing through load switch assembly 214(2).

FIGS. 12A-12H are graphs 1200, 1202, 1204, 1206, 1208, 1210, 1212, and 1214, respectively, of magnitude versus time where (a) controller 1018 is causing multi-port power converter 1002 to operate as a boost converter. (b) controller 1018 is causing load switch assembly 214(1) to operate in its blocking state, and (c) controller 1018 is causing load switch assembly 214(2) to operate in its freewheel state. Graphs 1200, 1202, 1204, 1206, 1208, 1210, 1212, and 1214 share a common time base, as shown by the dashed vertical lines connecting the graphs.

Graph 1200 includes a curve 1216 representing control signal $\phi_b$, and graph 1202 includes a curve 1218 representing controls signal $\phi_b'$. As in the example of FIGS. 11A-11H, control signal $\phi_b$ is continuously asserted, and control signal $\phi_b'$ is continuously de-asserted, which is consistent with multi-port power converter 1002 operating as a boost converter. Graph 1204 includes a curve 1220 representing control signal $\phi_c$, and graph 1206 includes a curve 1222 representing control signal $\phi_s'(2)$. Control signal $\phi_s'(2)$ is continuously asserted so that multi-port power converter 1002 can provide power to port 116(2), as well as so that load switch assembly 214(2) can provide a freewheel path for electric current $i_L$. Graph 1206 additionally includes a curve 1224 representing control signals $\phi_s(1)$ and $\phi_s'(1)$, which are continuously de-asserted due to load switch assembly 214(1) operating in its blocking state. Graph 1208 includes a curve 1226 representing control signal $\phi_s(2)$, which is asserted in response to control signal $\phi_c$ being de-asserted, so that load switch assembly 214(2) provides as a freewheel path for electric current $i_L$. Additionally, control signal $\phi_s(2)$ is never asserted while control signal $\phi_c$ is asserted, to prevent shorting of port 116(2) to ground. Graph 1210 includes a curve 1228 representing electric current $i_L$. Graph 1212 includes a curve 1230 representing electric current $i_p(1)$ flowing through load switch assembly 214(1), and graph 1214 includes a curve 1232 representing electric current $i_p(2)$ flowing through load switch assembly 214(2).

FIGS. 13A-13H are graphs 1300, 1302, 1304, 1306, 1308, 1310, 1312, and 1314, respectively, of magnitude versus time where (a) controller 1018 is causing multi-port power converter 1002 to operate as a buck converter, (b) controller 1018 is causing load switch assembly 214(1) to operate in its freewheel state, and (c) controller 1018 is causing load switch assembly 214(2) to operate in its blocking state. Graphs 1300, 1302, 1304, 1306, 1308, 1310, 1312, and 1314 share a common time base, as shown by the dashed vertical lines connecting the graphs.

Graph 1300 includes a curve 1316 representing control signal $\phi_b$, and graph 1302 includes a curve 1318 representing controls signal $\phi_b'$. Control signals $\phi_b$ and $\phi_b'$ are dynamic in this example, which is consistent with multi-port power converter 1002 operating as a buck converter. Graph 1304 includes a curve 1320 representing control signal $\phi_c$, which is continuously de-asserted due to multi-port power converter 1002 operating as a buck converter. Graph 1306 includes a curve 1322 representing each of control signal $\phi_s(1)$ and control signal $\phi_s'(1)$, which are continuously asserted to provide power to port 116(1). Graph 1308 includes a curve 1324 representing each of control signal $\phi_s(2)$ and control signal $\phi_s'(2)$, which are continuously de-asserted due to load switch assembly 214(2) operating in its blocking state. Graph 1310 includes a curve 1326 representing electric current $i_L$. Graph 1312 includes a curve 1328 representing electric current $i_p(1)$ flowing through load switch assembly 214(1), and graph 1314 includes a curve 1330 representing electric current $i_p(2)$ flowing through load switch assembly 214(2).

FIGS. 14A-14H are graphs 1400, 1402, 1404, 1406, 1408, 1410, 1412, and 1414, respectively, of magnitude versus time where (a) controller 1018 is causing multi-port power converter 1002 to operate as a buck converter, (b) controller 1018 is causing load switch assembly 214(1) to operate in its blocking state, and (c) controller 1018 is causing load switch assembly 214(2) to operate in its freewheel state. Graphs 1400, 1402, 1404, 1406, 1408, 1410, 1412, and 1414 share a common time base, as shown by the dashed vertical lines connecting the graphs.

Graph 1400 includes a curve 1416 representing control signal $\phi_b$, and graph 1402 includes a curve 1418 representing controls signal $\phi_b'$. Control signals $\phi_b$ and $\phi_b'$ are dynamic in this example, which is consistent with multi-port power converter 1002 operating as a buck converter. Graph 1404 includes a curve 1420 representing control signal $\phi_c$, which is continuously de-asserted due to multi-port power converter 1002 operating as a buck converter. Graph 1406 includes a curve 1422 representing each of control signal $\phi_s(1)$ and control signal $\phi_s'(1)$, which are continuously de-asserted due to load switch assembly 214(1) operating in its blocking state. Graph 1408 includes a curve 1424 representing each of control signal $\phi_s(2)$ and control signal $\phi_s'(2)$, which are continuously asserted to provide power to port 116(2). Graph 1410 includes a curve 1426 representing electric current $i_L$. Graph 1412 includes a curve 1428 representing electric current $i_p(1)$ flowing through load switch assembly 214(1), and graph 1414 includes a curve 1430 representing electric current $i_p(2)$ flowing through load switch assembly 214(2)

Combinations of Features

Features described above may be combined in various ways without departing from the scope hereof. The following examples illustrate some possible combinations.

(A1) A method for operating a multi-port power converter includes (1) controlling flow of electric current through an inductor of the multi-port power converter using a control switching device of the multi-port power converter, and (2) causing one of a plurality of load switch assemblies of the multi-port power converter to provide a freewheel path for electric current flowing through the inductor in response to the control switching device switching from its on-state to its off-state, each load switch assembly being electrically coupled between the inductor and a respective one of a plurality of ports of the multi-port power converter.

(A2) The method denoted as (A1) may further include alternating which load switch assembly of the plurality of load switch assemblies provides a freewheel path for electric current flowing through the inductor, to provide electric power to more than one of the plurality of ports of the multi-port power converter.

(A3) In either one of the methods denoted as (A1) and (A2), a first port of the plurality of ports may be electrically coupled to a wireless power transfer interface, and a second port of the plurality of ports may be electrically coupled to a wired power transfer interface.

(A4) In the method denoted as (A3), the wired power transfer interface may include an Universal Serial Bus (USB) interface.

(A5) Any one of the methods dented as (A1) through (A4) may further include preventing flow of electric current through each load switch assembly of the plurality of load switch assemblies other than the load switch assembly providing a freewheel path for electric current flowing through the inductor in response to the control switching device switching from its on-state to its off-state.

(A6) In any one of the methods denoted as (A1) through (A5), the multi-port power converter may have a topology selected from the group consisting of a boost topology and a buck and boost topology.

(B1) A multi-port power converter may include (1) an inductor, (2) a control switching device electrically coupled to the inductor, (3) a first load switch assembly electrically coupled between the inductor and a first port, (4) a second load switch assembly electrically coupled between the inductor and a second port, and (5) a controller configured to cause one of the first load switch assembly and the second load switch assembly to provide a freewheel path for electric current flowing through the inductor in response to the control switching device switching from its on-state to its off-state.

(B2) In the multi-port power converter denoted as (B1), the controller may be further configured to control duty cycle of the control switching device to regulate one or more parameters of the multi-port power converter.

(B3) In either one of the multi-port power converters denoted as (B1) and (B2), the controller may be further configured to alternately cause the first load switch assembly and the second load switch assembly to provide a freewheel path for electric current flowing through the inductor, to provide electric power to each of the first port and the second port.

(B4) In any of the multi-port power converters denoted as (B1) through (B3), the first load switch assembly may include a first field effect transistor (FET) and a second FET electrically coupled in series, and the second load switch assembly may include a third FET and a fourth FET electrically coupled in series.

(B5) In the multi-port power converter denoted as (B4), the first FET and the second FET may be configured in the multi-port power converter such that electric current cannot flow through the first FET and the second FET solely via respective body diodes of the first FET and the second FET, and the third FET and the fourth FET may be configured in the multi-port power converter such that electric current cannot flow through the third FET and the fourth FET solely via respective body diodes of the third FET and the fourth FET.

(B6) In any of the multi-port power converters denoted as (B1) through (B5), the multi-port power converter may be a boost topology.

(B7) In any of the multi-port power converters denoted as (B1) through (B5), the multi-port power converter may have a buck and boost topology.

(C1) An electrical system includes (1) a multi-port power converter, including (a) an inductor, (b) a control switching device electrically coupled to the inductor, (c) a first load switch assembly electrically coupled between the inductor and a first port of the multi-port power converter, (d) a second load switch assembly electrically coupled between the inductor and a second port of the multi-port power converter, and (c) a controller configured to cause one of the first load switch assembly and the second load switch assembly to provide a freewheel path for electric current flowing through the inductor in response to the control switching device switching from its on-state to its off-state; (2) a wireless power transfer interface electrically coupled to the first port; and (3) a wired power transfer interface electrically coupled to the second port.

(C2) In the electrical system denoted as (C1), the wired power transfer interface may include a Universal Serial Bus (USB) interface.

(C3) In either one of the electrical systems denoted as (C1) and (C2), the controller may be further configured to control duty cycle of the control switching device to regulate one or more of voltage at the first port and voltage at the second port.

(C4) In any one of the electrical systems denoted as (C1) through (C3), the controller may be further configured to alternately cause the first load switch assembly and the second load switch assembly to provide a freewheel path for electric current flowing through the inductor, to provide electric power to each of the first port and the second port.

(C5) In any one of the electrical systems denoted as (C1) through (C4), (1) the first load switch assembly may include a first field effect transistor (FET) and a second FET electrically coupled in series, (2) the second load switch assembly may include a third FET and a fourth FET electrically coupled in series.

(C6) In the electrical system denoted as (C5), (1) the first FET and the second FET may be configured in the multi-port power converter such that electric current cannot flow through the first FET and the second FET solely via respective body diodes of the first FET and the second FET, and (2) the third FET and the fourth FET may be configured in the multi-port power converter such that electric current cannot flow through the third FET and the fourth FET solely via respective body diodes of the third FET and the fourth FET.

(C7) In any one of the electrical systems denoted as (C1) through (C6), the multi-port power converter may have a boost topology.

(C8) In any one of the electrical systems denoted as (C1) through (C6), the multi-port power converter may have a buck and boost topology.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for operating a multi-port power converter, comprising: controlling flow of electric current through an inductor of the multi-port power converter using a control switching device of the multi-port power converter; and causing one of a plurality of load switch assemblies of the multi-port power converter to provide a freewheel path for electric current flowing through the inductor in response to the control switching device switching from its on-state to its off-state, each load switch assembly being electrically coupled between the inductor and a respective one of a plurality of ports of the multi-port power converter, wherein the inductor is coupled between an input capacitor and the control switch device.

2. The method of claim 1, further comprising alternating which load switch assembly of the plurality of load switch assemblies provides the freewheel path for the electric current flowing through the inductor, to provide electric power to more than one of the plurality of ports of the multi-port power converter.

3. The method of claim 1, wherein:
    a first port of the plurality of ports is electrically coupled to a wireless power transfer interface; and
    a second port of the plurality of ports is electrically coupled to a wired power transfer interface.

4. The method of claim 3, wherein the wired power transfer interface comprises an Universal Serial Bus (USB) interface.

5. The method of claim 1, further comprising preventing flow of electric current through each load switch assembly of the plurality of load switch assemblies other than the load switch assembly providing the freewheel path for the electric current flowing through the inductor in response to the control switching device switching from its on-state to its off-state.

6. The method of claim 1, wherein the multi-port power converter has a topology selected from a group consisting of a boost topology and a buck and boost topology.

7. A multi-port power converter, comprising: an inductor; a control switching device electrically coupled to the inductor; a first load switch assembly electrically coupled between the inductor and a first port; a second load switch assembly electrically coupled between the inductor and a second port; and a controller configured to cause one of the first load switch assembly and the second load switch assembly to provide a freewheel path for electric current flowing through the inductor in response to the control switching device switching from its on-state to its off-state, wherein the inductor is coupled between an input capacitor and the control switch device.

8. The multi-port power converter of claim 7, wherein the controller is further configured to control duty cycle of the control switching device to regulate one or more parameters of the multi-port power converter.

9. The multi-port power converter of claim 7, wherein the controller is further configured to alternately cause the first load switch assembly and the second load switch assembly to provide the freewheel path for the electric current flowing through the inductor, to provide electric power to each of the first port and the second port.

10. The multi-port power converter of claim 7, wherein:
    the first load switch assembly comprises a first field effect transistor (FET) and a second FET electrically coupled in series; and
    the second load switch assembly comprises a third FET and a fourth FET electrically coupled in series.

11. The multi-port power converter of claim 10, wherein:
    the first FET and the second FET are configured in the multi-port power converter such that electric current cannot flow through the first FET and the second FET solely via respective body diodes of the first FET and the second FET; and
    the third FET and the fourth FET are configured in the multi-port power converter such that electric current cannot flow through the third FET and the fourth FET solely via respective body diodes of the third FET and the fourth FET.

12. The multi-port power converter of claim 7, wherein the multi-port power converter has a boost topology.

13. The multi-port power converter of claim 7, wherein the multi-port power converter has a buck and boost topology.

14. An electrical system, comprising: a multi-port power converter, including: an inductor, a control switching device electrically coupled to the inductor, a first load switch assembly electrically coupled between the inductor and a first port of the multi-port power converter, a second load switch assembly electrically coupled between the inductor and a second port of the multi-port power converter, and a controller configured to cause one of the first load switch assembly and the second load switch assembly to provide a freewheel path for electric current flowing through the inductor in response to the control switching device switching from its on-state to its off-state; a wireless power transfer interface electrically coupled to the first port; and a wired power transfer interface electrically coupled to the second port, wherein the inductor is coupled between an input capacitor and the control switch device.

15. The electrical system of claim 14, where the wired power transfer interface comprises a Universal Serial Bus (USB) interface.

16. The electrical system of claim 14, wherein the controller is further configured to control duty cycle of the control switching device to regulate one or more of voltage at the first port and voltage at the second port.

17. The electrical system of claim 14, wherein the controller is further configured to alternately cause the first load switch assembly and the second load switch assembly to provide the freewheel path for the electric current flowing through the inductor, to provide electric power to each of the first port and the second port.

18. The electrical system of claim 14, wherein:
    the first load switch assembly comprises a first field effect transistor (FET) and a second FET electrically coupled in series; and
    the second load switch assembly comprises a third FET and a fourth FET electrically coupled in series.

19. The electrical system of claim 18, wherein:
    the first FET and the second FET are configured in the multi-port power converter such that electric current cannot flow through the first FET and the second FET solely via respective body diodes of the first FET and the second FET; and
    the third FET and the fourth FET are configured in the multi-port power converter such that electric current cannot flow through the third FET and the fourth FET solely via respective body diodes of the third FET and the fourth FET.

20. The electrical system of claim 14, wherein the multi-port power converter has a topology selected from a group consisting of (a) a boost topology and (b) a buck and boost topology.

* * * * *